US012562648B2

(12) United States Patent
Yoon et al.

(10) Patent No.: US 12,562,648 B2
(45) Date of Patent: Feb. 24, 2026

(54) BIDIRECTIONAL SWITCHING CONVERTER AND OPERATING METHOD THEREOF

(71) Applicant: Samsung Electronics Co., Ltd., Suwon-si (KR)

(72) Inventors: Kyeseok Yoon, Yongin-si (KR); Hyebong Ko, Seoul (KR); Jinwoo So, Hwaseong-si (KR); Hyoungseok Oh, Seoul (KR); Daewoong Cho, Yongin-si (KR); Jungwook Heo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 966 days.

(21) Appl. No.: 17/665,933

(22) Filed: Feb. 7, 2022

(65) Prior Publication Data

US 2022/0255435 A1     Aug. 11, 2022

(30) Foreign Application Priority Data

Feb. 8, 2021    (KR) ........................ 10-2021-0017870
Oct. 22, 2021    (KR) ........................ 10-2021-0141981

(51) Int. Cl.
| | |
|---|---|
| *H02J 7/00* | (2006.01) |
| *H02J 7/14* | (2006.01) |
| *H02M 1/00* | (2006.01) |
| *H02M 3/158* | (2006.01) |

(52) U.S. Cl.
CPC ......... *H02M 3/1582* (2013.01); *H02J 7/0047* (2013.01); *H02J 7/0063* (2013.01); *H02J 7/00712* (2020.01); *H02M 1/0009* (2021.05)

(58) Field of Classification Search
CPC .. H02M 3/1582; H02J 7/00712; H02J 7/0047; H02J 7/0063

USPC ........................................................ 320/134
See application file for complete search history.

(56) References Cited

U.S. PATENT DOCUMENTS

| | | | |
|---|---|---|---|
| 8,350,543 B2 | 1/2013 | Loikkanen et al. | |
| 8,354,831 B2 | 1/2013 | Wrathall | |
| 8,786,267 B2 | 7/2014 | Lu et al. | |
| 9,369,041 B2 | 6/2016 | Paduvalli et al. | |
| 9,543,829 B2 * | 1/2017 | Choi ...................... | H02M 3/157 |
| 9,742,390 B2 * | 8/2017 | North .................. | H02M 3/1588 |

(Continued)

OTHER PUBLICATIONS

Z. Sun, K. W. R. Chew, H. Tang and L. Siek, "Adaptive Gate Switching Control for Discontinuous Conduction Mode DC-DC Converter," in IEEE Transactions on Power Electronics, vol. 29, No. 3, pp. 1311-1320, Mar. 2014, doi: 10.1109/TPEL.2013.2263579. (Year: 2014).*

(Continued)

*Primary Examiner* — Alexis B Pacheco
(74) *Attorney, Agent, or Firm* — Fish & Richardson P.C.

(57) ABSTRACT

The inventive concepts provide a bidirectional switching converter including a first power metal oxide semiconductor field effect transistor (MOSFET) connecting an input voltage node to a switching node, a second power MOSFET connecting the switching node to a ground node, and a zero current detection (ZCD) auto-calibration circuit configured to perform one of an operation of generating a first offset for varying a turn-on time of the first power MOSFET according to an operation mode and an operation of generating a second offset for varying a turn-on time of the second power MOSFET according to the operation mode.

20 Claims, 12 Drawing Sheets

10

(56) References Cited

U.S. PATENT DOCUMENTS

| 10,014,777 | B1 * | 7/2018 | Shumkov | H02M 3/1582 |
| 10,164,535 | B2 | 12/2018 | Xi et al. | |
| 10,404,173 | B1 * | 9/2019 | de Cremoux | H02M 3/157 |
| 10,742,202 | B1 * | 8/2020 | English | H04B 10/6933 |
| 10,784,775 | B1 * | 9/2020 | Chang | H02M 1/08 |
| 2005/0077906 | A1 | 4/2005 | Baumgartner | |
| 2008/0246455 | A1 * | 10/2008 | Chu | H02M 3/1588 |
| | | | | 323/283 |
| 2015/0077081 | A1 * | 3/2015 | Ejury | H02M 3/158 |
| | | | | 327/109 |
| 2017/0229917 | A1 * | 8/2017 | Kurs | B60L 53/12 |
| 2017/0366090 | A1 * | 12/2017 | Sugawara | H02M 3/156 |
| 2019/0081546 | A1 * | 3/2019 | Hsu | H02M 3/158 |
| 2019/0296640 | A1 * | 9/2019 | Tsai | H02M 3/1588 |
| 2020/0144901 | A1 * | 5/2020 | Bi | H02M 3/1588 |
| 2021/0211052 | A1 * | 7/2021 | Zhao | H02M 1/0009 |
| 2022/0029534 | A1 * | 1/2022 | Chen | H02M 3/158 |

OTHER PUBLICATIONS

Xianzhi Meng et al., "Real Time Zero Current Detection with Low Quiescent Current for Synchronous DC-DC Converter", 2017 IEEE 26th International Symposium on Industrial Electronics, Jun. 19-21, 2017.

Jongbeom Baek et al., "Switched inductor capacitor buck converter with >85% power efficiency in 100uA-to-300mA loads using a bang-bang zero-current detector", 2018 IEEE Custom Integrated Circuits Conference, Apr. 8-11, 2018.

Sun Zhuochao, et al: "Adaptive Gate Switching Control for Discontinuous Conduction Mode DC-DC Converter", IEEE Transactions on Power Electronics, Institute of Electrical and Electronics Engineers, USA, vol. 29, No. 3, Mar. 1, 2014, pp. 1311-1320, XP011527635.

Communication including the extended European Search Report issued on Jun. 24, 2022 in European Application No. 22155678.0.

Gao, Yuan et al. "A novel zero-current-detector for DCM operation in synchronous converter." Industrial Electronics (ISIE), 2012 IEEE International Symposium On, IEEE (2012): pp. 99-104.

Konjedic, T. et al. "DCM-Based Zero-Voltage Switching Control of a Bidirectional DC-DC Converter With Variable Switching Frequency." IEEE Transactions on Power Electronics, Institute of Electrical and Electronics Engineers, USA. vol. 31, No. 4 (2016): pp. 3273-3288.

European Office Action dated Jan. 15, 2025 issued in corresponding European Patent Appln. No. 22155678.0.

* cited by examiner

BIDIRECTIONAL SWITCHING CONVERTER AND OPERATING METHOD THEREOF

CROSS-REFERENCE TO RELATED APPLICATIONS

This application claims priority under 35 U.S.C. § 119 to Korean Patent Application No. 10-2021-0017870, filed on Feb. 8, 2021, and Korean Patent Application No. 10-2021-0141981, filed on Oct. 22, 2021, in the Korean Intellectual Property Office, the disclosures of which are incorporated by reference herein in their entireties.

BACKGROUND

The inventive concepts relate to a converter, and more particularly, to a bidirectional switching converter and/or an operating method of the bidirectional switching converter.

With the development of electronic technologies, various types of electronic devices have been used. Mobile electronic devices may be driven by battery devices included therein. According to an increase in power consumption of the electronic devices, battery capacity has been increased, and thus, batteries may be charged at various speeds according to magnitudes of voltages supplied by chargers, such as a fast charging method or a general charging method.

SUMMARY

The inventive concepts provide a bidirectional switching converter capable of tracking in real time a point in time when an inductor current is zero.

According to an aspect of the inventive concepts, there is provided a bidirectional switching converter including a first power MOSFET connecting an input voltage node to a switching node, a second power MOSFET connecting the switching node to a ground node, and a zero current detection (ZCD) auto-calibration circuit configured to perform one of an operation of generating a first offset for varying a turn-on time of the first power MOSFET according to an operation mode and an operation of generating a second offset for varying a turn-on time of the second power MOSFET according to the operation mode, wherein the ZCD auto-calibration circuit may vary one of a value of the first offset and a value of the second offset, based on a differential value of a voltage of the switching node and a forward-bias detection result.

According to another aspect of the inventive concepts, there is provided an electronic device including a battery, a bidirectional switching converter including a first power MOSFET connecting an input voltage node to a switching node, a second power MOSFET connecting the switching node to a ground node, and a zero current detection (ZCD) auto-calibration circuit configured to perform one of an operation of generating a first offset for varying a turn-on time of the first power MOSFET according to an operation mode and an operation of generating a second offset for varying a turn-on time of the second power MOSFET according to the operation mode, a first interface providing the battery with a power supplied from an external device, and a second interface providing the external device with a power output from the battery, wherein the ZCD auto-calibration circuit may change one of a value of the first offset and a value of the second offset, based on a differential value of a voltage of the switching node and a forward-bias detection result.

According to another aspect of the inventive concepts, there is provided a method of operating a bidirectional switching converter including setting an initial offset, identifying an operation mode of the bidirectional switching converter, determining whether a forward bias voltage is detected between a first terminal and a second terminal of a first power MOSFET or between a first terminal and a second terminal of a second power MOSFET, according to the identified operation mode, and determining whether an absolute value of a differential value of a voltage of a switching node is greater than a threshold when the forward bias voltage is not detected, wherein the first power MOSFET may connect an input voltage node to the switching node, and the second power MOSFET may connect the switching node to a ground node.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Hereinafter, embodiments of the inventive concepts will be described in detail with reference to the accompanying drawings.

Figure 1:
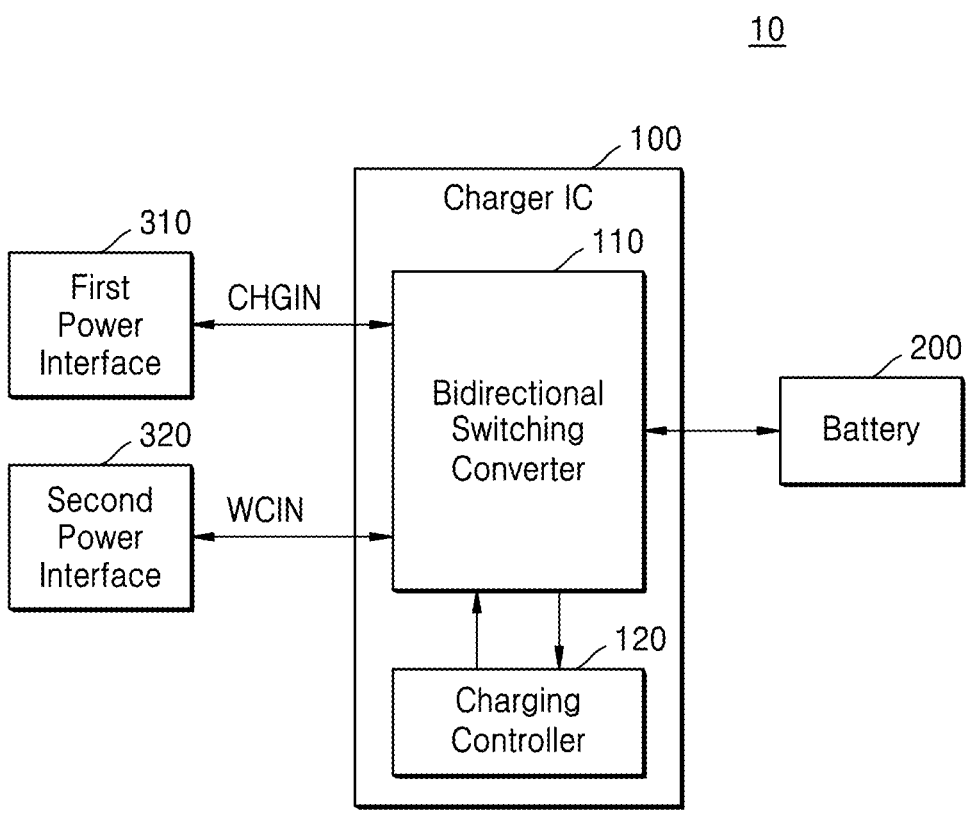
FIG. 1 is a block diagram schematically illustrating an electronic device including a charger integrated circuit according to an example embodiment of the inventive concepts.

FIG. 1 is a block diagram schematically illustrating an electronic device including a charger integrated circuit according to an example embodiment of the inventive concepts.

Referring to FIG. 1, an electronic device 10 may include a charger integrated circuit (IC) 100 and a battery 200. In addition to this, the electronic device 10 may further include a main processor and peripheral devices. For example, the electronic device 10 may include a mobile device such as a smartphone, a tablet personal computer (PC), a cellular phone, a personal digital assistant (PDA), a laptop, a wearable device, a global positioning system (GPS) device, an e-book terminal, a digital broadcasting terminal, a motion picture experts group (MPEG) layer-3 (MP3) player, or a digital camera. For example, the electronic device 10 may include an electric vehicle.

The battery 200 may be mounted in the electronic device 10. In one embodiment, the battery 200 may be detachable from the electronic device 10. The battery 200 may include one or a plurality of battery cells. The plurality of battery cells may be connected in series or in parallel to each other. When an external charging device is not connected to the electronic device 10, the battery 200 may supply power to the electronic device 10.

The charger IC 100 may charge the battery 200 and may be referred to as a "battery charger". In addition, the charger IC 100 may supply power to an external device (for example, a wired interface or a wireless interface) connected to the charger IC 100 based on a voltage charged in the battery 200. For example, the charger IC 100 may be implemented as an integrated circuit chip and may be mounted on a printed circuit board.

The charger IC 100 may include a bidirectional switching converter 110 and a charging controller 120. The bidirectional switching converter 110 may be implemented as a direct current (DC)-DC converter and may generate an output voltage by dropping or boosting an input voltage. When dropping the input voltage of the bidirectional switching converter 110, that is, during a buck conversion operation, a first power path may be formed in a first direction, and when boosting the input voltage, that is, during a boost conversion operation, a second power path may be formed in a second direction opposite to the first direction.

The bidirectional switching converter 110 may operate in a buck mode (also referred to as buck single mode), a boost mode (or referred to as boost single mode), or a buck-boost mode (also referred to as buck-boost combined mode).

In the buck mode, the bidirectional switching converter 110 may boost an input voltage by performing a buck conversion operation through a first switching operation and may charge the battery 200 based on the boosted voltage.

In the boost mode, the bidirectional switching converter 110 may drop a voltage input from the battery 200 by performing a boost conversion operation through a second switching operation and may supply power to an external device based on the dropped voltage.

In the buck-boost mode, the bidirectional switching converter 110 may perform the buck conversion operation or the boost conversion operation through a third switching operation according to a load current. In the buck-boost mode, the bidirectional switching converter 110 may charge the battery 200 or supply power to an external device.

The charging controller 120 may perform mode switching between a plurality of charging modes of the bidirectional switching converter 110, for example, a buck mode, a boost mode, and a buck-boost mode and may control a switching operation of the bidirectional switching converter 110 such that a voltage level of an output voltage is the same as or similar to a target voltage level in the plurality of charging modes.

The charging controller 120 may receive a sensing current and a sensing voltage from the bidirectional switching converter 110 and may generate a control signal and a switching signal switching for controlling a switching operation in each charging mode of the bidirectional switching converter 110 based on the sensing current and the sensing voltage.

In some embodiments, the charger IC 100 may support at least one of various functions such as an under-voltage lockout (UVLO) function, an over-current protection (OCP) function, an over-voltage protection (OVP) function, a soft-start function of reducing an inrush current, a foldback current limit function, a Hiccup Mode function for short circuit protection, and an over-temperature protection (OTP) function so as to properly operate even under a power saving condition.

In one embodiment, the electronic device 10 may support wired charging and wireless charging and may include a first power interface 310 and a second power interface 320 for the wired charging and the wireless charging. In one embodiment, the first power interface 310 may be implemented as a wired power interface and may include a wired charging circuit. The second power interface 320 may be implemented as a wireless power interface and may include a wireless charging circuit.

The charger IC 100 may receive a first input voltage CHGIN from the first power interface 310 and/or a second input voltage WCIN from the second power interface 320 and may charge the battery 200 based on the first input voltage CHGIN and/or the second input voltage WCIN in the buck mode.

The charger IC 100 may provide power to the first power interface 310 and/or the second power interface 320 based on a voltage of the battery 200 in the boost mode.

The charger IC 100 may receive the first input voltage CHGIN from the first power interface 310 or the second input voltage WCIN from the second power interface 320, charge the battery 200 based on the first input voltage CHGIN or the second input voltage WCIN, and provide power to the second power interface 320 or the first power interface 310 based on the first input voltage CHGIN or the second input voltage WCIN in the buck-boost mode. Alternatively, the charger IC 100 may provide power to the second power interface 320 based on the first input voltage CHGIN and a voltage of the battery 200 or may provide power to the first power interface 310 based on the second input voltage WCIN and the voltage of the battery 200.

For example, a travel adapter (TA) or an auxiliary battery may be electrically connected to the first power interface 310. The TA may convert alternate current (AC) voltages 110 V to 220 V, which are commercial voltages, or voltages supplied from another power supply (for example, a computer) into DC voltages required for charging the battery 200 and provide the DC voltages to the electronic device 10. The charger IC 100 may charge the battery 200 or provide power to the second power interface 320 by using the first input voltage CHGIN received from the TA, the auxiliary battery, or so on in the buck mode.

For example, an on-the-go (OTG) device (for example, an OTG Universal Serial Bus (USB) device and so on) may be connected to the first power interface 310, and the charger integrated circuit 310 may provide power to the OTG device through the first power interface 310. In this case, the bidirectional switching converter 310 may provide power to the OTG device based on a voltage of the battery 200 in the boost mode or may provide power to the OTG device in the buck mode while charging the battery 200 based on the second input voltage WCIN from the second power interface 320.

As described above, the electronic device 10 supports wired and wireless charging, and the charger IC 100 has to operate in a plurality of charging modes including the buck mode, the boost mode, and the buck-boost mode to support wired charging and/or wireless charging, wired charging-wireless power supply, and wireless charging-wired power supply, and even when an input power supply is unstable, a seamless mode transition between the buck mode, the boost mode, and the buck-boost mode is required for stable wireless power supply or stable wired power supply.

Figure 2:
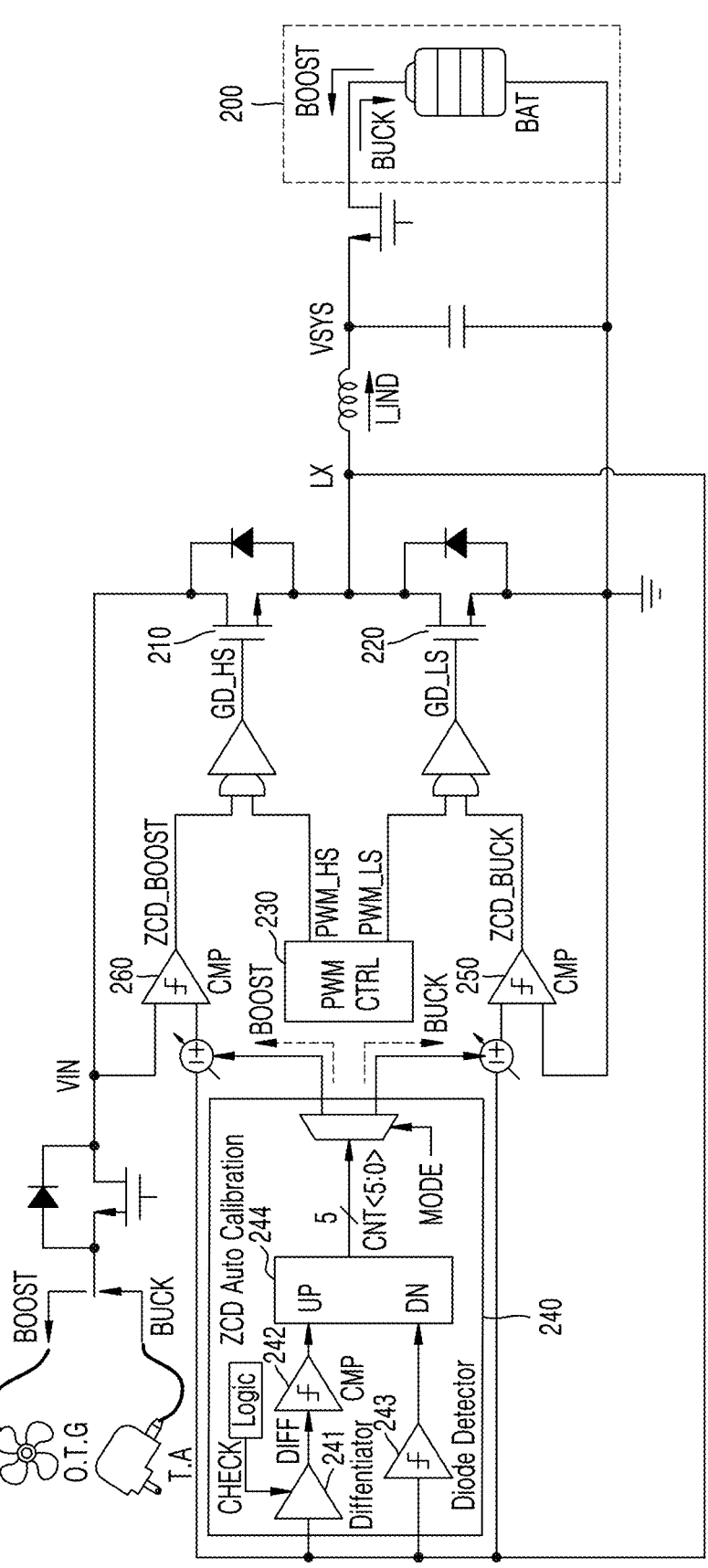
FIG. 2 is a diagram of a bidirectional switching converter according to an example embodiment of the inventive concepts.

FIG. 2 is a diagram of a bidirectional switching converter 110 according to an example embodiment of the inventive concepts.

Referring to FIG. 2, the bidirectional switching converter 110 may include a first power metal oxide semiconductor field effect transistor (MOSFET) 210, a second power MOSFET 220, a pulse width modulation (PWM) controller 230, and a zero current detection (ZCD) auto-calibration circuit 240.

According to an embodiment, the PWM controller 230 may output a first control signal PWM_HS and a second control signal PWM_LS. The first control signal PWM_HS may include a control signal for turning on/off the first power MOSFET 210. The second control signal PWM_LS may include a control signal for turning on/off the second power MOSFET 220. The PWM controller 230 may adjust an output ratio between the first control signal PWM_HS and the second control signal PWM_LS in response to a mode signal MODE instructing an operation mode. The first power MOSFET 210 may be referred to as a high side (HS) switching device, and the second power MOSFET 220 may be referred to as a low side (LS) switching device.

The ZCD auto-calibration circuit 240 may adjust in real time an offset value for detecting a zero current of a switching node LX. The ZCD auto-calibration circuit 240 may reduce or increase the offset value based on a differential value of the switching node LX and a detection result of a diode detector 243.

For example, while the bidirectional switching converter 110 operates in the buck mode, the second power MOSFET 220 may be turned off before a switching current I_IND flowing through the switching node LX is zero. The ZCD auto-calibration circuit 240 may reduce the offset value to delay a point in time when the second power MOSFET 220 is turned off.

In another example, while the bidirectional switching converter 110 operates in the buck mode, the second power MOSFET 220 may be turned off after the switching current I_IND flowing through the switching node LX is zero. The ZCD auto-calibration circuit 240 may increase the offset value to move up the point in time when the second power MOSFET 220 is turned off. Detailed operations of the ZCD auto-calibration circuit 240 are described below.

According to an embodiment, the ZCD auto-calibration circuit 240 may further include a differentiator 241, a comparator 242, and a diode detector 243. The differentiator 241 may differentiate a voltage value of the switching node LX and output a result value to the comparator 242. For example, the result value may be obtained by differentiating the voltage value of the switching node LX and taking an absolute value thereof. According to an embodiment, the differentiator 241 may include a capacitor for generating a differential current of the switching current I_IND, a mirror circuit for copying the generated differential current, and a resistor for converting a copied differential current into a voltage in order to differentiate the voltage value of the switching node LX.

According to an embodiment, the comparator 242 may receive a differential value from the differentiator 241 and compare the differential value with a threshold. When the result value is greater than the threshold, the comparator 242 may output a control signal instructing to increase a count value to the counter 244. When the result value is less than the threshold, the comparator 242 may output a control signal instructing to maintain the count value to the counter 244.

According to an embodiment, the diode detector 243 may detect a current direction of the switching current I_IND flowing through the switching node LX. In the buck mode, the diode detector 243 may compare a voltage of the switching node LX and a voltage of a ground node, which are both ends (i.e. a first terminal and a second terminal, respectively) of the second power MOSFET 220 in the buck mode, to detect whether a forward bias voltage is applied thereto. In the boost mode, the diode detector 243 may compare a voltage of the input voltage node VIN and a voltage of the switching node LX, which are both ends (i.e., a first terminal and a second terminal, respectively) of the first power MOSFET 210, to detect whether a forward bias voltage is applied thereto. The diode detector 243 may generate a control signal for reducing an offset in response to detection of the forward bias voltage and transmit the control signal to the counter 244.

According to an embodiment, the counter 244 may adjust an offset value based on the control signal received from the differentiator 241 and the diode detector 243. For example, the counter 244 may receive an up-control signal from the comparator 242 while operating in the buck mode. The up-control signal received from the comparator 242 may be a signal requesting to increase an offset value. The counter 244 may also receive a down-control signal from the diode detector 243. The down-control signal may be a signal requesting to increase an offset value.

According to an embodiment, the ZCD auto-calibration circuit 240 may receive a mode signal MODE and output the adjusted offset value according to an operation mode. For example, when the ZCD auto-calibration circuit 240 receives the mode signal MODE indicating the buck mode, an offset value may be output to a buck comparator 250. In another example, when the ZCD auto-calibration circuit 240 receives the mode signal MODE indicating the boost mode, the offset value may be output to a boost comparator 260. A turn-on ratio or a turn-off ratio of the first power MOSFET 210 may vary according to the first control signal PWM_HS and a result of comparison performed by the boost comparator 260 based on the switching node LX and the offset value. A turn-on ratio or a turn-off ratio of the second power MOSFET 220 may vary according to the second control signal PWM_LS and a result of comparison performed by the buck comparator 250 based on the switching node LX and the offset value. The turn-on ratios and turn-off ratios of the first power MOSFET 210 and the second power MOSFET 220 may vary, and thus, a turn-off time of the first power MOSFET 210 and a turn-off time of the second power MOSFET 220 may also vary.

Figure 3A:
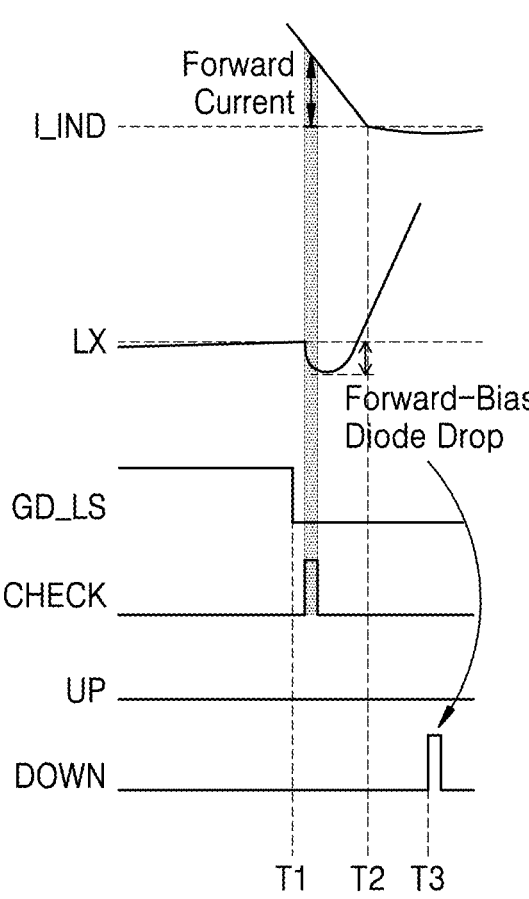
FIG. 3A is a timing diagram illustrating when a point in time when a second power metal oxide semiconductor field effect transistor (MOSFET) is turned off is earlier than a point in time when a switching current is zero in a buck mode, according to an example embodiment of the inventive concepts.

FIG. 3A is a timing diagram illustrating when a point in time when the second power MOSFET 220 is turned off is earlier than a point in time when the switching current LIND is zero in the buck mode according to example embodiments of the inventive concepts.

Referring to FIG. 3A, the switching current LIND may flow in a forward direction. The forward direction may be a direction in which a current flows to the battery 200. The switching current LIND may have a positive value when the switching current LIND flows in the forward direction. The second power MOSFET 220 may be turned off when a gate signal GD_LS is transitioned to a logic low level. A check signal may be generated at a falling edge of the gate signal GD_LS. The check signal may be an impulse signal applied to a gate of the second power MOSFET 220. A voltage of the switching node LX may change according to a current direction of the switching current LIND at a point in time when the check signal is generated. Referring to FIG. 3A, the gate signal GD_LS of the second power MOSFET 220 may be transitioned to a logic low level at a point in time T1 to generate a check signal. The switching current LIND may be zero at a point in time T2. That is, the second power MOSFET 220 may be first turned off before the switching current LIND is zero. In a case where the switching current LIND flows in the forward direction when the second power MOSFET 220 is turned off, the switching current LIND may flow through a body diode of the second power MOSFET 220. When the switching current LIND flows through the body diode of the second power MOSFET 220, a forward-bias diode drop may occur at the switching node LX. Due to the diode drop, a voltage of the switching node LX may drop by about 0.7 V. At a point in time T3, the ZCD auto-calibration circuit 240 may reduce an offset value to delay a point in time when the gate signal GD_LS of the second power MOSFET 220 is transitioned to a logic low level.

Figure 3B:
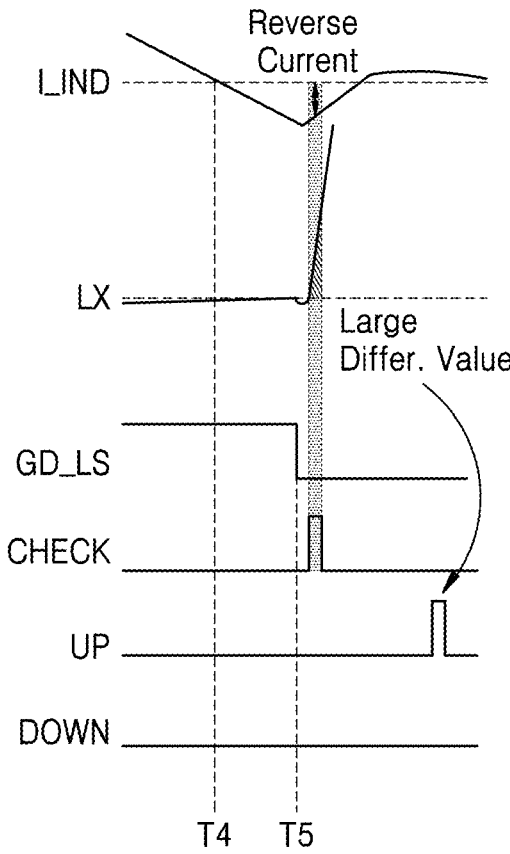
FIG. 3B is a timing diagram illustrating when the turn-off time of the second power MOSFET is later than the point in time when the switching current is zero in the buck mode, according to an example embodiment of the inventive concepts.

FIG. 3B is a timing diagram illustrating when a point in time when the second power MOSFET 220 is turned off is later than a point in time when the switching current LIND is zero in the buck mode, according to an example embodiment of the inventive concepts.

Referring to FIG. 3B, the switching current LIND may flow in a reverse direction. The reverse direction may be a direction in which a current flows from the battery 200. The switching current LIND may have a negative value when flowing in the reverse direction. Referring to FIG. 3B, the gate signal GD_LS of the second power MOSFET 220 may be transitioned to a logic low level at a point in time T4 to generate a check signal. The switching current LIND may be zero at a point in time T5. That is, the second power MOSFET 220 may be turned off after the switching current I_IND is zero. In a case where the switching current I_IND flows in the reverse direction when the second power MOSFET 220 is turned off, a voltage of the switching node LX may rapidly increase. Because the voltage of the switching node LX rapidly increases, a differential value of the voltage of the switching node LX may be great enough to be greater than a threshold. When the differential value of the voltage of the switching node LX is greater than the threshold, the ZCD auto-calibration circuit 240 may increase an offset value to move up a point in time when the gate signal GD_LS of the second power MOSFET 220 is transitioned to a logic low level at the point in time T3.

Figure 4:
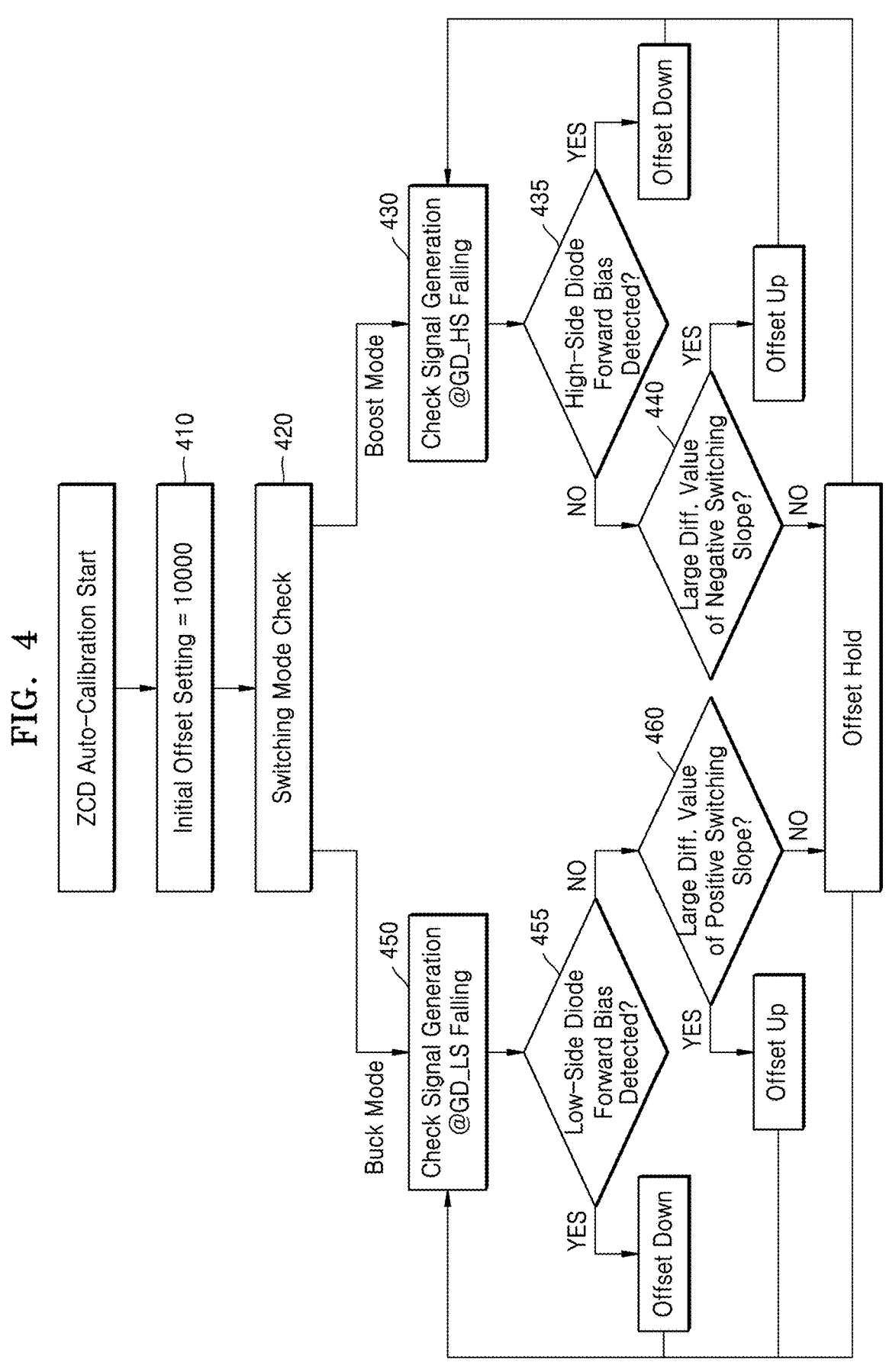
FIG. 4 is a flowchart illustrating a method of operating a zero current detection (ZCD) auto-calibration circuit according to an example embodiment of the inventive concepts.

FIG. 4 is a flowchart illustrating a method of operating the ZCD auto-calibration circuit according to an example embodiment of the inventive concepts.

Referring to FIG. 4, the ZCD auto-calibration circuit 240 may set an initial offset value during operation 410. The initial offset value may be a preset value during a manufacturing process. However, an environment of the manufacturing process and an operating environment may change depending on process, voltage, temperature (PVT) variation. Due to the PVT variation, a point in time when the second power MOSFET 220 is turned off according to the initial offset value may not be same with a point in time when the switching current I_IND is zero. In addition, even when the PVT variation is removed, a point in time when the second power MOSFET 220 is turned off according to the initial offset value may not be same with a point in time when the switching current I_IND is zero according to a voltage of the battery 200 in a fully charged state and a voltage of the battery 200 in a discharged state.

In operation 420, the ZCD auto-calibration circuit 240 may determine whether an operation mode is a buck mode or a boost mode. For example, the ZCD auto-calibration circuit 240 may receive the mode signal MODE from the charging controller 120. For example, when the bidirectional switching converter 110 supports the buck mode and the boost mode, the mode signal MODE may be 1 bit. The ZCD auto-calibration circuit 240 may identify that the boost mode is indicated when the mode signal MODE is in a logic high level and the buck mode is indicated when the mode signal MODE is in a logic low level.

In operation 430, the ZCD auto-calibration circuit 240 may generate a check signal when the first power MOSFET 210 is turned off. The ZCD auto-calibration circuit 240 may determine to the boost mode in operation 420. The ZCD auto-calibration circuit 240 may monitor on/off of the first power MOSFET 210 based on the boost mode. The ZCD auto-calibration circuit 240 may generate a check signal when the first power MOSFET 210 is turned off. The check signal may include a control signal for activating the differentiator 241 to measure the differential value of the voltage of the switching node LX.

In operation 435, the ZCD auto-calibration circuit 240 may determine whether a forward bias voltage is detected by the diode detector 243. When a point in time when the first power MOSFET 210 is turned off is earlier than a point in time when the switching current I_IND is zero, the switching current I_IND may flow to the diode detector 243. Thus, the diode detector 243 may detect a forward bias voltage. In this case, the forward bias voltage may be a positive voltage. When the forward bias voltage is detected, the counter 244 may reduce an offset value. As the offset value is reduced, a time interval during which the first power MOSFET 210 is first turned off may be reduced. As the time interval during which the first power MOSFET 210 is first turned off is reduced, the forward bias voltage detected by the diode detector 243 may also be gradually reduced. When the forward bias voltage is not detected by the diode detector 243, the ZCD auto-calibration circuit 240 may proceed to operation 440.

In operation 440, the ZCD auto-calibration circuit 240 may determine whether the differential value of the voltage of the switching node LX is greater than a threshold. For example, the point in time when the first power MOSFET 210 is turned off may be later than the point in time when the switching current I_IND is zero. When the first power MOSFET 210 is turned off, the switching current I_IND may flow to the battery 200. While the switching current I_IND flows into the battery 200 to charge the battery 200, a voltage of the switching node LX may be reduced.

Because the switching current I_IND is a current flowing through an inductor, a magnitude of the switching current I_IND flowing into the battery 200 may depend on a magnitude of a slope at which the voltage of the switching node LX is reduced. That is, as the magnitude of the switching current I_IND flowing into the battery 200 increases, the voltage of the switching node LX may be rapidly reduced. When the magnitude of the switching current I_IND flowing into the battery 200 is increased, the comparator 242 may determine that a differential value output from the differentiator 241 is greater than a threshold. In this case, the differential value may be a negative value. As an absolute value of the differential value is greater than the threshold, the counter 244 may increase the offset value. When the offset value increases since the switching current I_IND is 0 until the first power MOSFET 210 is turned off, the voltage of the switching node LX may be slowly reduced by LC resonance due to parasitic capacitances of the inductor and the switching node LX. The counter 244 may maintain the offset value when the voltage of the switching node LX is slowly reduced by the LC resonance and the absolute value of the differential value is less than the threshold.

In the embodiment described above, it is described that whether a forward bias voltage is detected is first determined by the diode detector 243 in operation 435, and then whether a differential value of a voltage of the switching node LX is greater than a threshold is determined by the differentiator 241 in operation 440 but the inventive concepts are not limited thereto. According to various embodiments, the ZCD auto-calibration circuit 240 may also first determine whether a differential value is greater than a threshold in operation 440 or may also simultaneously perform operation 435 and operation 440.

In operation 450, the ZCD auto-calibration circuit 240 may generate a check signal when the second power MOSFET 220 is turned off. The ZCD auto-calibration circuit 240 may determine the buck mode in operation 420. The ZCD auto-calibration circuit 240 may monitor on/off of the second power MOSFET 220 based on the buck mode. The ZCD auto-calibration circuit 240 may generate a check signal when the second power MOSFET 220 is turned off. The check signal may be a control signal for activating the differentiator 241 to measure a differential value of a voltage of the switching node LX.

In operation 455, the ZCD auto-calibration circuit 240 may determine whether a forward bias voltage is detected by the diode detector 243. When the second power MOSFET 220 is turned off before the switching current LIND is zero, the switching current LIND may flow to the diode detector 243. Thus, diode detector 243 may detect the forward bias voltage. In this case, the forward bias voltage may be a negative voltage. When the forward bias voltage is detected, the counter 244 may reduce an offset value. As the offset value is reduced, a time interval between the point in time point when the switching current LIND is zero and the point in time when the second power MOSFET 220 is turned off may be reduced. As the time interval at which the second power MOSFET 220 is first turned off is reduced, a magnitude of the forward bias voltage detected by the diode detector 243 may be gradually reduced. When the forward bias voltage is not detected by the diode detector 243, the ZCD auto-calibration circuit 240 may proceed to operation 460.

In operation 460, the ZCD auto-calibration circuit 240 may determine whether the differential value of the voltage of the switching node LX is greater than a threshold. For example, the point in time when the second power MOSFET 220 is turned off may be later than the point in time when the switching current LIND is zero. When the second power MOSFET 220 is turned off, the switching current LIND may be output from the battery 200. While the switching current I_IND is output from the battery 200 to discharge the battery 200, the voltage of the switching node LX may increase.

Because the switching current I_IND is a current flowing through the inductor, a magnitude of the switching current I_IND output from the battery 200 may depend on a magnitude of a slope at which the voltage of the switching node LX increases. That is, as the magnitude of the switching current I_IND output from the battery 200 increases, the voltage of the switching node LX may rapidly increase. When the magnitude of the switching current I_IND output from the battery 200 is increased, the comparator 242 may determine that a differential value output from the differentiator 241 is greater than a threshold. In this case, the differential value may be a positive value. As an absolute value of the differential value is greater than the threshold, the counter 244 may increase the offset value. When the switching current I_IND is 0 and the offset value increases until the second power MOSFET 220 is turned off, the voltage of the switching node LX may be slowly reduced by LC resonance due to parasitic capacitances of the inductor and the switching node LX. The counter 244 may maintain the offset value when the voltage of the switching node LX is slowly reduced by the LC resonance and the absolute value of the differential value is less than the threshold.

In the embodiment described above, it is described that whether a forward bias voltage is detected is first determined by the diode detector 243 in operation 455, and then whether a differential value of a voltage of the switching node LX is greater than a threshold is determined by the differentiator 241 in operation 460 but the inventive concepts are not limited thereto. According to various embodiments, the ZCD auto-calibration circuit 240 may also first determine whether a differential value is greater than a threshold in operation 460 or may also simultaneously perform operation 455 and operation 460.

Figure 5A:
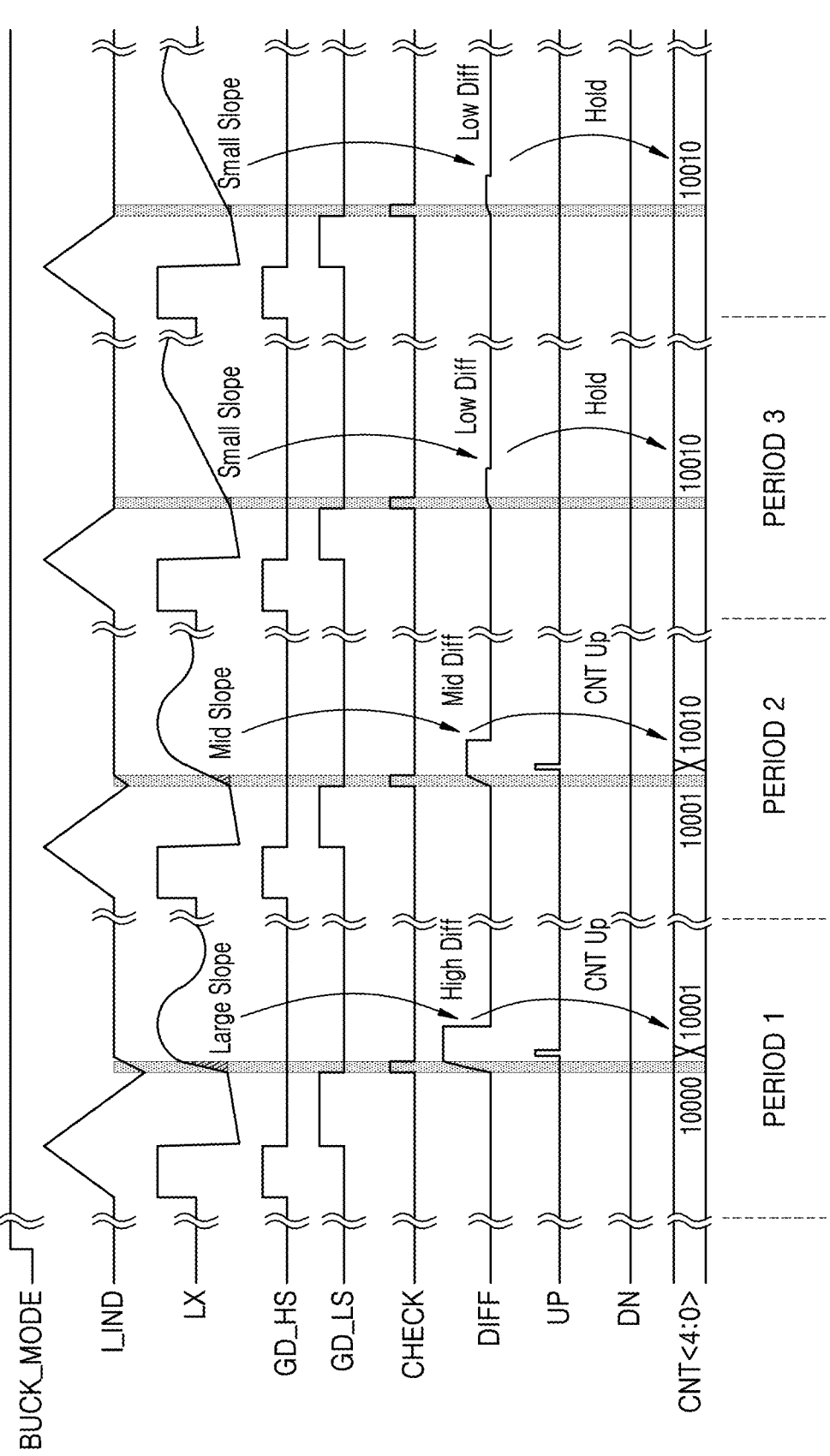
FIG. 5A is a timing diagram illustrating an operation of the ZCD auto-calibration circuit in a buck mode, according to an example embodiment of the inventive concepts.

FIG. 5A is a timing diagram according to an operation of the ZCD auto-calibration circuit 240 in a buck mode, according to an example embodiment of the inventive concepts.

Referring to FIG. 5A, the bidirectional switching converter 110 may operate in the buck mode. An offset value may be represented as 5 bits. For example, an initial offset value may be "10000".

When the gate signal GD_HS of the second power MOSFET 220 is transitioned to a logic low level in response to the buck mode, the ZCD auto-calibration circuit 240 may generate a check signal CHECK to monitor a change in a voltage of the switching node LX and whether the diode detector 243 detects a forward bias voltage. As illustrated in FIG. 5A, a point in time when the check signal CHECK is generated by turning off the second power MOSFET 210 may be earlier than a point in time when the switching current I_IND is zero. Because the switching current I_IND flows in a reverse direction when the check signal CHECK is generated, the diode detector 243 does not detect a forward bias voltage. The ZCD auto-calibration circuit 240 may check a differential value of the voltage of the switching node LX. Because the switching current I_IND flows in a reverse direction, the voltage of the switching node LX may be rapidly boosted. As a magnitude of the switching current I_IND in the reverse direction is reduced, a slope of the boosted voltage of the switching node LX may be reduced. The ZCD auto-calibration circuit 240 may detect that a differential value of the voltage of the switching node LX is greater than a threshold and generate a control signal UP that increases the offset value by 1, and the offset value may correspond to 10001 increased by 1.

When a second period PERIOD2 starts, the offset value may correspond to 10001, which is increased by 1. Because the offset value is increased, a length of time during which the gate signal GD_LS of the second power MOSFET 220 maintains a logic high level may be shorter than a first period PERIOD1. That is, a point in time when the second power MOSFET 220 is turned off during the second period PERIOD2 may be earlier than a point in time when the second power MOSFET 220 is turned off during the first period PERIOD1. However, the point in time when the second power MOSFET 220 is turned off during the second period PERIOD2 may still be later than the point in time when the switching current I_IND is zero. Because the length of time during which the second power MOSFET 220 maintains the logic high level is reduced, a maximum magnitude of the switching current I_IND flowing in the reverse direction may also be reduced. Because the maximum magnitude of the switching current I_IND flowing in the reverse direction is reduced, a slope at which the voltage of the switching node LX is boosted during the second period PERIOD2 may be less than a slope at which the voltage of the switching node LX is boosted during the first period PERIOD1. However, the ZCD auto-calibration circuit 240 may detect that a differential value of the voltage of the switching node LX is greater than a threshold, even during the second period PERIOD2 and generate the control signal UP for increasing the offset value by one, and the offset value may correspond to 10010 increased by 1.

When a third period PERIOD3 starts, the offset value may correspond to 10010 increased by 2 with respect to an initial offset. Because the offset value is further increased, the length of time during which the gate signal GD_LS of the second power MOSFET 220 maintains a logic high level during the third period PERIOD3 may be shorter than the length of time of the second period PERIOD2. That is, the point in time when the second power MOSFET 220 is turned off during the third period PERIOD3 may be earlier than the point in time when the second power MOSFET 220 is turned off during the second period PERIOD2. For example, the point in time when the second power MOSFET 220 is turned off during the third period PERIOD3 may be approximately same with the point in time when the switching current I_IND is zero. Because the length of time during which the second power MOSFET 220 maintains the logic high level is reduced, a maximum magnitude of the switching current I_IND flowing in the reverse direction may also be further reduced. Because the maximum magnitude of the switching current I_IND flowing in the reverse direction is reduced, a slope at which the voltage of the switching node LX is boosted during the third period PERIOD3 may be less than the slope at which the voltage of the switching node LX is boosted during the second period PERIOD2. In addition, the voltage of the switching node LX may be slowly increased due to LC resonance caused by parasitic capacitances of the inductor and the switching node LX. The ZCD auto-calibration circuit 240 detects that the differential value of the voltage of the switching node LX is less than the threshold, and the offset value may be maintained at a value of 10010 without being increased.

Figure 5B:
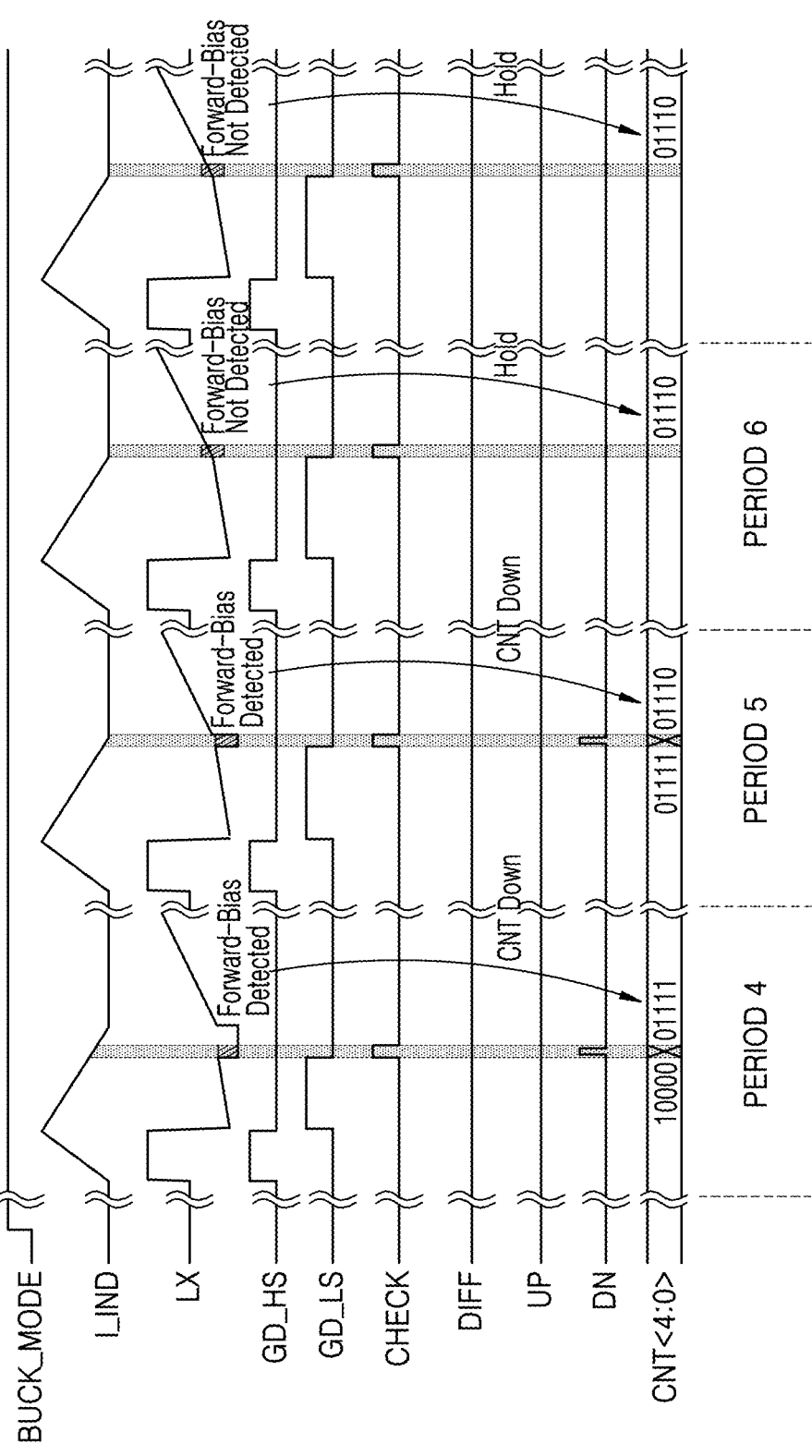
FIG. 5B is a timing diagram illustrating an operation of the ZCD auto-calibration circuit in the buck mode, according to another example embodiment of the inventive concepts.

FIG. 5B is a timing diagram according to an operation of the ZCD auto-calibration circuit 240 in the buck mode, according to another example embodiment of the inventive concepts.

Referring to FIG. 5B, the bidirectional switching converter 110 may operate in the buck mode. An offset value may be represented as 5 bits. For example, an initial offset value may be 10000.

When the gate signal GD_LS of the second power MOSFET 220 is transitioned to a logic low level in response to the buck mode, the ZCD auto-calibration circuit 240 may generate a check signal CHECK to monitor a change in a voltage of the switching node LX and whether the diode detector 243 detects a forward bias voltage. As illustrated in FIG. 5B, a point in time when the check signal CHECK is generated by turning off the second power MOSFET 220 may be later than a point in time when the switching current I_IND is zero. Because the switching current I_IND flows in a forward direction when the check signal CHECK is generated, the diode detector 243 may detect a forward bias voltage. When the check signal CHECK is applied, the switching current I_IND may flow to a body diode of the second power MOSFET 220. Accordingly, the forward bias voltage may have a negative value. For example, the forward bias voltage may be −0.7 V. The counter 244 may reduce an offset value in response to receiving a detection signal from the diode detector 243.

When a fifth period PERIOD5 starts, the offset value may correspond to 01111 reduced by 1. Because the offset value is reduced, a length of time during which the gate signal GD_LS of the second power MOSFET 220 maintains a logic high level may be longer than the first period PERIOD1. A point in time when the second power MOSFET 220 is turned off during the second period PERIOD2 may be later than a point in time when the second power MOSFET 220 is turned off during the first period PERIOD1. However, the point in time when the second power MOSFET 220 is turned off during the second period PERIOD2 may still be earlier than the point in time when the switching current I_IND is zero. Accordingly, when the check signal CHECK is applied, the switching current I_IND may flow to the body diode of the second power MOSFET 220. The forward bias voltage may have a negative value. For example, the forward bias voltage may be −0.4 V. The counter 244 may further reduce the offset value in response to receiving the detection signal from the diode detector 243.

When a sixth period PERIOD6 starts, the offset value may correspond to 01110 reduced by 2 with respect to the initial offset. Because the offset value is further reduced, the length of time during which the gate signal GD_LS of the second power MOSFET 220 maintains a logic high level during the sixth period PERIOD6 may be shorter than the length of time of the second period PERIOD2. That is, the point in time when the second power MOSFET 220 is turned off during the sixth period PERIOD6 may be earlier than the point in time when the second power MOSFET 220 is turned off during a fifth period PERIOD5. For example, the point in time when the second power MOSFET 220 is turned off during the sixth period PERIOD6 may be approximately same with the point in time when the switching current I_IND is zero. Accordingly, when the check signal CHECK is applied, the forward bias voltage may not be detected. The counter 244 may maintain the offset value in response to receiving a control signal, from the diode detector 243, indicating that the forward bias voltage is not detected.

Figure 6A:
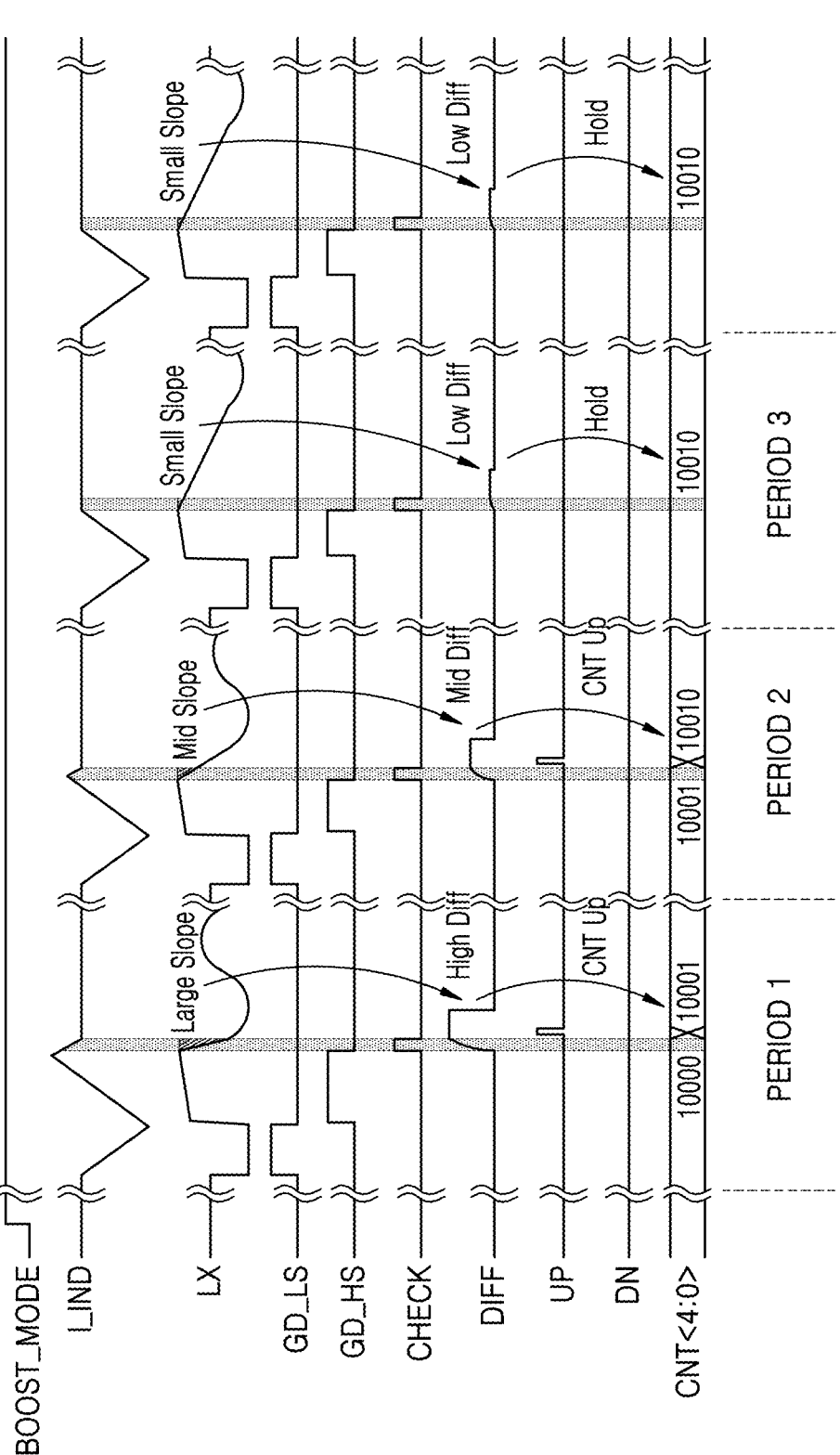
FIG. 6A is a timing diagram illustrating an operation of a ZCD auto-calibration circuit in a boost mode, according to an example embodiment of the inventive concepts.

FIG. 6A is a timing diagram according to an operation of the ZCD auto-calibration circuit 240 in a boost mode, according to an example embodiment of the inventive concepts.

Referring to FIG. 6A, the bidirectional switching converter 110 may operate in the boost mode. An offset value may be represented as 5 bits. For example, an initial offset value may be "10000".

When a gate signal GD_HS of the first power MOSFET 210 is transitioned to a logic low level in response to the boost mode, the ZCD auto-calibration circuit 240 may generate a check signal CHECK to monitor a change in a voltage of the switching node LX and whether the diode detector 243 detects a forward bias voltage. As illustrated in FIG. 6A, a point in time when the check signal CHECK is generated by turning off the first power MOSFET 210 may be earlier than a point in time when the switching current LIND is zero. When the check signal CHECK is generated, the switching current LIND may flow in a forward direction. The diode detector 243 measuring both ends of the first power MOSFET 210 during the boost mode may not detect the forward bias voltage. The ZCD auto-calibration circuit 240 may check a differential value of a voltage of the switching node LX. Because the switching current LIND flows in a forward direction, the voltage of the switching node LX may rapidly drop. As a magnitude of the forward switching current LIND is reduced, a slope at which the voltage of the switching node LX drops may be reduced. The ZCD auto-calibration circuit 240 may detect that a differential value of the voltage of the switching node LX is greater than a threshold and increase an offset value by 1.

When the second period PERIOD2 starts, the offset value may correspond to 10001 increased by 1. Because the offset value is increased, a length of time during which the gate signal GD_HS of the first power MOSFET 210 maintains a logic high level may be shorter than the first period PERIOD1. A point in time when the first power MOSFET 210 is turned off during the second period PERIOD2 may be earlier than a point in time when the first power MOSFET 210 is turned off during the first period PERIOD1. However, the point in time when the first power MOSFET 210 is turned off during the second period PERIOD2 may be later than the point in time when the switching current LIND is zero. Because the length of time during which the first power MOSFET 210 maintains the logic high level is reduced, a maximum magnitude of the switching current LIND flowing in the forward direction may also be reduced. Because the maximum magnitude of the switching current LIND flowing in the forward direction is reduced, a slope at which the voltage of the switching node LX drops during the second period PERIOD2 may be less than a slope at which the voltage of the switching node LX drops during the first period PERIOD1. However, the ZCD auto-calibration circuit 240 may detect that a differential value of the voltage of the switching node LX is greater than a threshold, even during the second period PERIOD2 and increase the offset value by one.

When the third period PERIOD3 starts, the offset value may correspond to 10010 increased by 2 with respect to an initial offset. Because the offset value is further increased, the length of time during which the gate signal GD_HS of the first power MOSFET 210 maintains a logic high level during the third period PERIOD3 may be shorter than the length of time of the second period PERIOD2. That is, the point in time when the first power MOSFET 210 is turned off during the third period PERIOD3 may be earlier than the point in time when the first power MOSFET 210 is turned off during the second period PERIOD2. For example, the point in time when the first power MOSFET 210 is turned off during the third period PERIOD3 may be approximately same with the point in time when the switching current I_IND is zero. Because the length of time during which the first power MOSFET 210 maintains the logic high level is reduced, a maximum magnitude of the switching current I_IND flowing in the forward direction may also be further reduced. Because the maximum magnitude of the switching current I_IND flowing in the forward direction is reduced, a slope at which the voltage of the switching node LX drops during the third period PERIOD3 may be less than the slope at which the voltage of the switching node LX drops during the second period PERIOD2. In addition, the voltage of the switching node LX may be slowly reduced due to LC resonance caused by parasitic capacitances of the inductor and the switching node LX. The ZCD auto-calibration circuit 240 detects that the differential value of the voltage of the switching node LX is less than the threshold, and the offset value may be maintained at a value of 10010 without being increased.

Figure 6B:
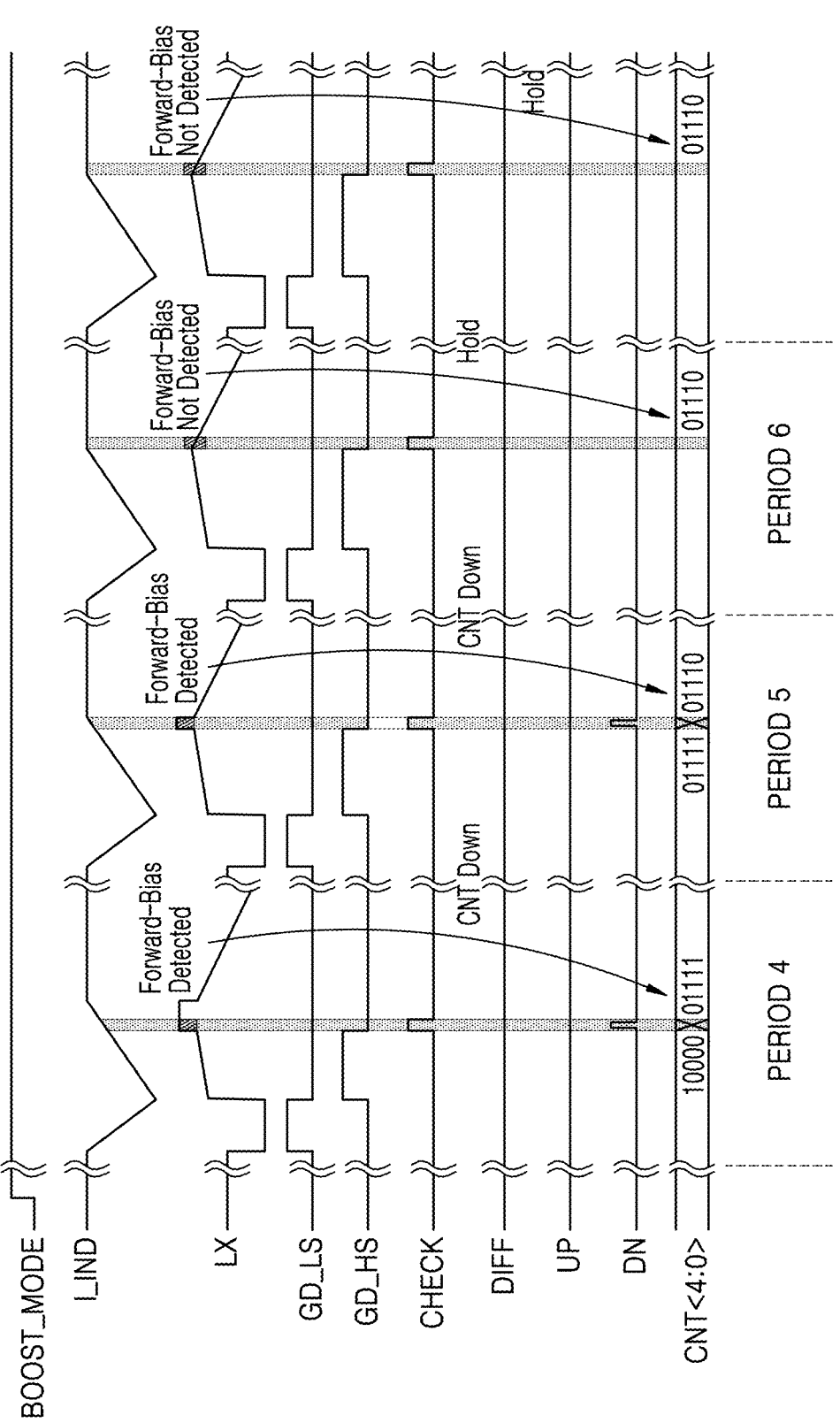
FIG. 6B is a timing diagram illustrating another operation of the ZCD auto-calibration circuit in the boost mode, according to another example embodiment of the inventive concepts.

FIG. 6B is a timing diagram according to an operation of the ZCD auto-calibration circuit 240 in a boost mode according to another example embodiment of the inventive concepts.

Referring to FIG. 6B, the bidirectional switching converter 110 may operate in the boost mode. An offset value may be represented as 5 bits. For example, an initial offset value may be 10000.

When the gate signal GD_HS of the first power MOSFET 210 is transitioned to a logic low level in response to the boost mode, the ZCD auto-calibration circuit 240 may generate the check signal CHECK to monitor a change in a voltage of the switching node LX and whether the diode detector 243 detects a forward bias voltage. As illustrated in FIG. 6B, a point in time when the check signal CHECK is generated by turning off the first power MOSFET 210 may be later than a point in time when the switching current I_IND is zero. When the check signal CHECK is generated, the switching current I_IND may flow in a reverse direction. During the boost mode, the diode detector 243 measuring voltages of both ends of the first power MOSFET 210 may detect a forward bias voltage. When the check signal CHECK is applied, the switching current I_IND may flow to a body diode of the first power MOSFET 210. Accordingly, the forward bias voltage may have a positive value. For example, the forward bias voltage may be +0.7 V. The counter 244 may reduce an offset value in response to receiving a detection signal from the diode detector 243.

When the fifth period PERIOD5 starts, the offset value may correspond to 01111 reduced by 1. Because the offset value is reduced, a length of time during which the gate signal GD_HS of the first power MOSFET 210 maintains a logic high level may be longer than the first period PERIOD1. A point in time when the first power MOSFET 210 is turned off during the second period PERIOD2 may be later than a point in time when the first power MOSFET 210 is turned off during the first period PERIOD1. However, the point in time when the first power MOSFET 210 is turned off during the second period PERIOD2 may still be earlier than the point in time when the switching current I_IND is zero. Accordingly, when the check signal CHECK is applied, the switching current I_IND may flow to the body diode of the first power MOSFET 210. The forward bias voltage may have a positive value. For example, the forward bias voltage may be +0.4 V. The counter 244 may further reduce the offset value in response to receiving the detection signal from the diode detector 243.

When the sixth period PERIOD6 starts, the offset value may correspond to 01110 reduced by 2 with respect to an initial offset. Because the offset value is further reduced, the length of time during which the gate signal GD_HS of the first power MOSFET 210 maintains a logic high level during the sixth period PERIOD6 may be shorter than the length of time of the second period PERIOD2. The point in time when the first power MOSFET 210 is turned off during the sixth period PERIOD6 may be earlier than the point in time when the first power MOSFET 210 is turned off during the fifth period PERIOD5. For example, the point in time when the first power MOSFET 210 is turned off during the sixth period PERIOD6 may be approximately same with the point in time when the switching current I_IND is zero. Accordingly, when the check signal CHECK is applied, the forward bias voltage may not be detected. The counter 244 may maintain the offset value in response to receiving a control signal, from the diode detector 243, indicating that the forward bias voltage is not detected.

Figure 7:
FIG. 7 illustrates Monte Carlo simulation results of detecting a zero current of a switching node, according to an example embodiment of the inventive concepts.

FIG. 7 illustrates Monte Carlo simulation results of detecting a zero current of a switching node according to an example embodiment of the inventive concepts.

FIG. 7 illustrates Monte Carlo simulation results of 3000 samples for the switching current I_IND.

According to an embodiment, when the ZCD auto-calibration circuit 240 is deactivated, and when the first power MOSFET 210 or the second power MOSFET 220 is turned off, the switching current I_IND may range from about −279 mA to about 216 mA.

According to an embodiment, when the ZCD auto-calibration circuit 240 is activated, and when the first power MOSFET 210 or the second power MOSFET 220 is turned off, the switching current I_IND may range from about −44 mA to about 7.5 mA.

According to the embodiments described above, the charger IC 100 including the ZCD auto-calibration circuit 240 according to the inventive concepts performs switching at a point in time when the switching current LIND is nearly zero, and thus, power consumption may be reduced and an efficient operation may be performed efficiently at low power.

Figure 8:
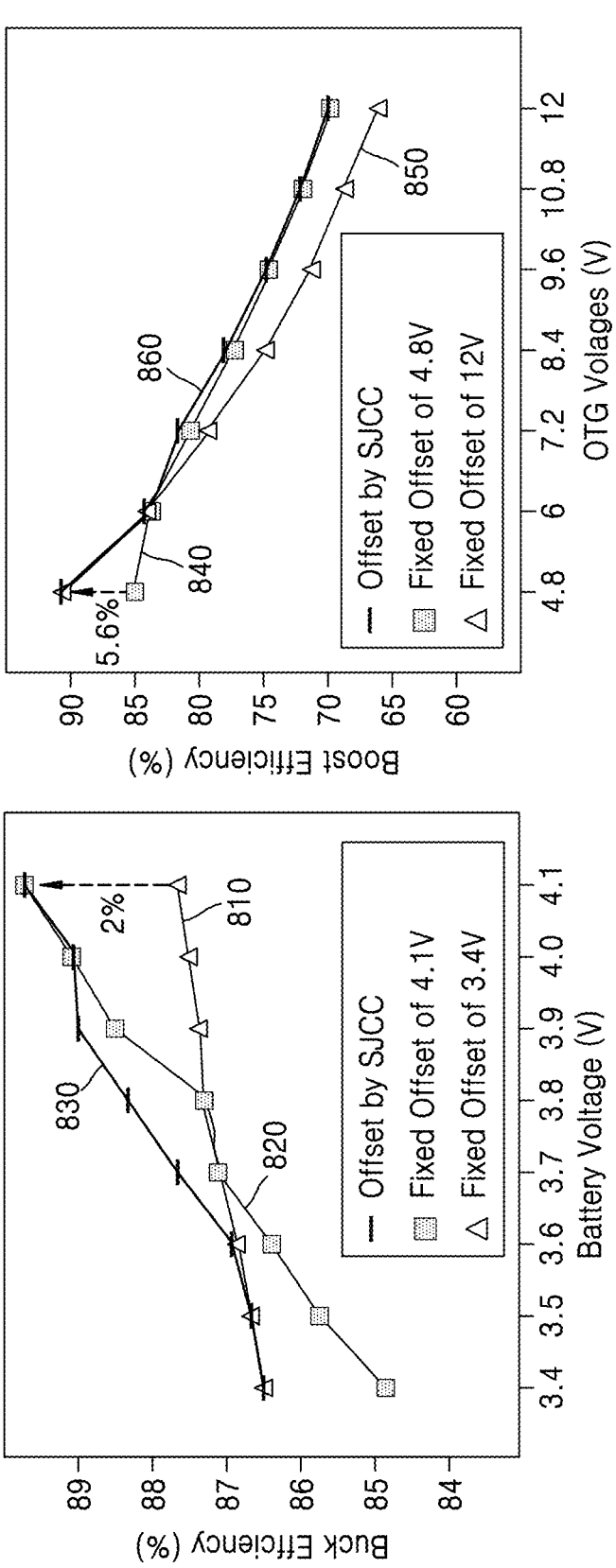
FIG. 8 illustrates graphs showing efficiency improvement obtained by using a ZCD auto-calibration circuit according to an example embodiment of the inventive concepts.

FIG. 8 illustrates graphs showing efficiency improvement obtained by using a ZCD auto-calibration circuit according to an example embodiment of the inventive concepts.

Referring to FIG. 8, buck converter efficiency and boost converter efficiency are illustrated therein. According to an embodiment, a first graph 810 to a third graph 830 may correspond to when the bidirectional switching converter 110 operates in a buck mode. The first graph 810 and the second graph 820 show the buck converter efficiency of the bidirectional switching converter 110 that does not include the ZCD auto-calibration circuit 240.

The first graph 810 shows the buck converter efficiency based on an offset value for turning off the second power MOSFET 220 when a voltage of the battery 200 is about 3.4 V and when the switching current LIND is zero. The first graph 810 shows high efficiency of about 86% to about 87% when the battery 200 is in a poor charging state (for example, about 3.4 V to about 3.6 V).

The second graph 820 shows the buck converter efficiency based on the offset value for turning off the second power MOSFET 220 when the voltage of the battery 200 is about 4.1 V and when the switching current LIND is zero. The second graph 820 shows high efficiency of about 89% when the battery 200 is in a good charging state (for example, about 4.0 V to about 4.1 V).

That is, it can be seen that, when the offset value is fixed and when the voltage of the battery 200 varies, the efficiency may be high in some voltages of the battery 200, but the efficiency may be low in the other voltages. This is because it does not guarantee that the second power MOSFET 220 is turned off when the switching current LIND is zero in the other voltages.

The third graph 830 shows the buck converter efficiency when the ZCD auto-calibration circuit 240 is provided to vary the offset value in real time. Referring to the third graph 830, it can be seen that the efficiency is high whether the battery 200 is in a good charging state or a bad charging state. For example, when the battery 200 is in a poor charging state, the efficiency is equal to efficiency shown in the first graph 810, and when the battery 200 is in a good charging state, the efficiency is equal to efficiency shown in the second graph 820.

According to another embodiment, a fourth graph 840 to a sixth graph 860 may correspond to when the bidirectional switching converter 110 operates in the boost mode. The fourth graph 840 and the fifth graph 850 show the boost converter efficiency of the bidirectional switching converter 110 that does not include the ZCD auto-calibration circuit 240.

The fourth graph 840 shows the boost converter efficiency based on an offset value for turning off the first power MOSFET 210 when an OTG voltage is about 4.8 V and when the switching current LIND is zero. The fourth graph 840 shows high efficiency of about 90% when the OTG voltage is low.

The fifth graph 850 shows the boost converter efficiency based on the offset value for turning off the first power MOSFET 210 when the OTG voltage is about 12 V and when the switching current LIND is zero. The fifth graph 850 shows that the higher the OTG voltage, the higher the efficiency, and the lower the OTG voltage, the lower the efficiency. That is, it can be seen that, when the offset value is fixed and when the OTG voltage varies, the efficiency may be high in some of the OTG voltages, but the efficiency is low in the others of the OTG voltages.

The sixth graph 860 shows the boost converter efficiency when the ZCD auto-calibration circuit 240 is provided to vary the offset value in real time. Referring to the sixth graph 860, it can be seen that the sixth graph 860 shows high efficiency for all OTG voltage values of the battery 200.

Figure 9:
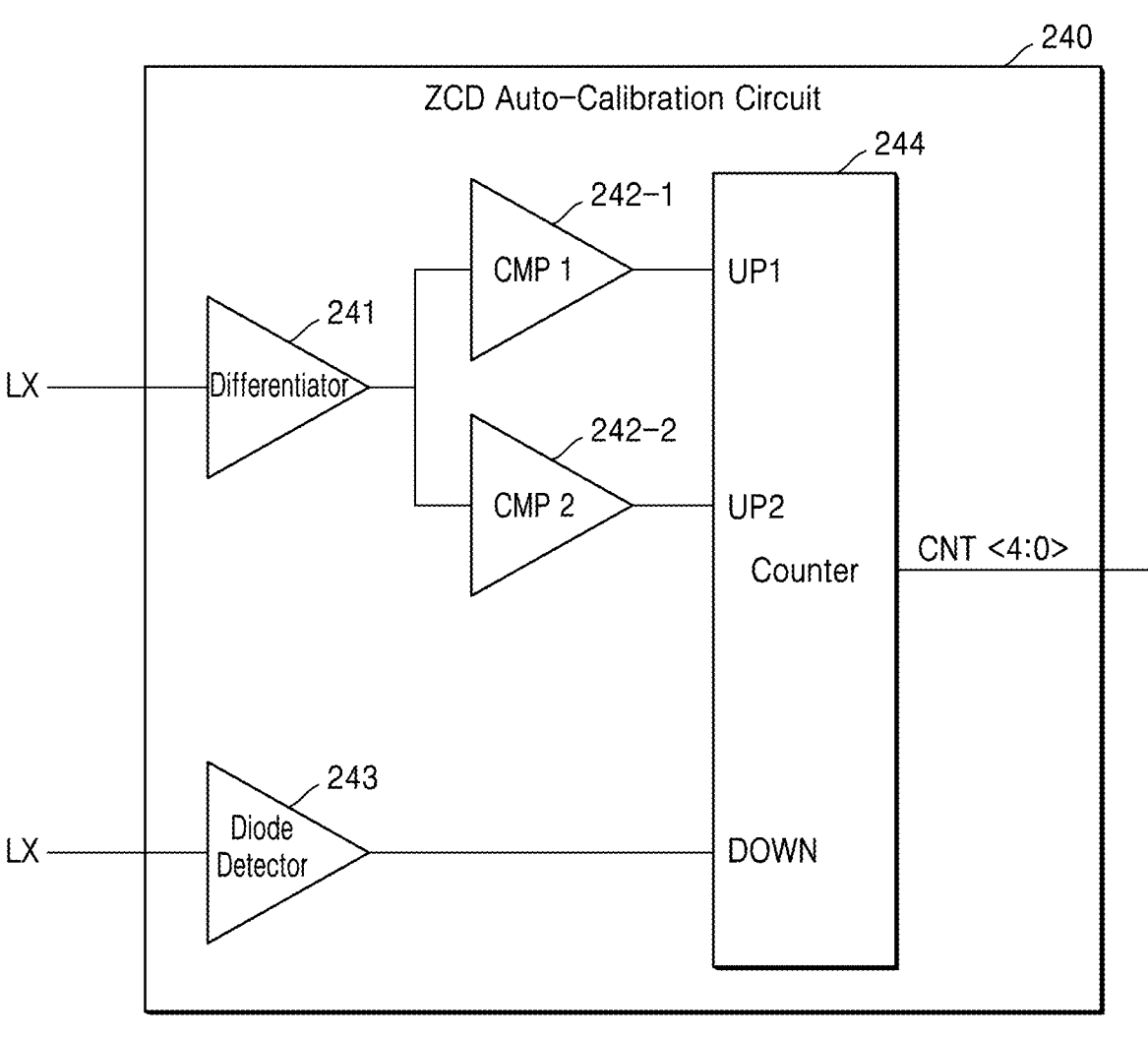
FIG. 9 illustrates another example of the ZCD auto-calibration circuit according to an example embodiment of the inventive concepts.

FIG. 9 illustrates another example of the ZCD auto-calibration circuit 240 according to an example embodiment of the inventive concepts.

Referring to FIG. 9, the ZCD auto-calibration circuit 240 may include a first comparator 242-1 and a second comparator 242-2. The differentiator 241 may differentiate the voltage value of the switching node LX and transmit a differential value to the first comparator 242-1 and the second comparator 242-2.

The first comparator 242-1 may compare a first threshold with the differential value. For example, when the differential value is greater than the first threshold, the first comparator 242-1 may output a control signal instructing to increase an offset to the counter 244.

The second comparator 242-2 may compare a second threshold with the differential value. For example, when the differential value is greater than the second threshold, the second comparator 242-2 may output a control signal instructing to increase the offset to the counter 244. In this case, the second threshold may be greater than the first threshold.

The counter 244 may receive control signals from the first comparator 242-1 and the second comparator 242-2. For example, when the differential value is greater than the first threshold and the second threshold, the counter 244 may increase the offset by 2. In another example, when the differential value is greater than the first threshold and less than the second threshold, the counter 244 may increase the offset by 1. In another example, when the differential value is less than the first threshold and the second threshold, the counter 244 may maintain the offset.

When the ZCD auto-calibration circuit 240 illustrated in FIG. 9 is used, the second period PERIOD2 of FIG. 5A may be omitted. For example, when the differential value measured during the first period PERIOD1 is greater than the first threshold and the second threshold, the counter 244 may increase the offset value by 2, not by 1. Accordingly, a differential value measured during the next period of the first period PERIOD1 may be changed to be close to a differential value of the third period PERIOD3.

According to the embodiments described above, a magnitude of the offset may be varied by comparing the differential value of the switching node LX with a plurality of threshold values, but the inventive concepts are not limited thereto. In various embodiments, the diode detector 243 may set various magnitudes for reducing an offset by comparing a magnitude of a forward bias voltage with a plurality of thresholds without comparing the magnitude of the forward bias voltage with a single threshold.

Additionally, the electronic device 10 and/or the components included therein may include and/or be included in processing circuitry such as hardware including logic circuits; a hardware/software combination such as a processor executing software; or a combination thereof. For example, the processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

While the inventive concepts have been particularly shown and described with reference to embodiments thereof, it will be understood that various changes in form and details may be made therein without departing from the spirit and scope of the following claims.

What is claimed is:

1. A bidirectional switching converter comprising:
a first power metal oxide semiconductor field effect transistor (MOSFET) connecting a first node to a switching node;
a second power MOSFET connecting the switching node to a ground node; and
a zero current detection (ZCD) auto-calibration circuit configured to perform one of an operation of generating a first offset for varying a turn-on time of the first power MOSFET according to an operation mode and an operation of generating a second offset for varying a turn-on time of the second power MOSFET according to the operation mode,
wherein the ZCD auto-calibration circuit is configured to change one of a value of the first offset and a value of the second offset, based on a differential value of a voltage of the switching node and a forward-bias detection result.

2. The bidirectional switching converter of claim 1, wherein the ZCD auto-calibration circuit further comprises a differentiator configured to differentiate the voltage of the switching node to obtain the differential value;
a comparator configured to receive the differential value from the differentiator, compare the differential value with a first threshold and output an offset increase signal for increasing one of the first offset and the second offset;
a diode detector configured to detect a detection of one of a forward bias voltage between a first terminal and a second terminal of the first power MOSFET and a forward bias voltage between a first terminal and a second terminal of the second power MOSFET according to the operation mode, and output an offset decrease signal for reducing one of the first offset and the second offset according to a result of the detection; and
a counter configured to receive the offset increase signal and the offset decrease signal and vary one of the first offset and the second offset.

3. The bidirectional switching converter of claim 2, wherein the diode detector is further configured to detect the forward bias voltage between the first terminal and the second terminal of the second power MOSFET when the operation mode corresponds to a buck mode, and
detect the forward bias voltage between the first terminal and the second terminal of the first power MOSFET when the operation mode corresponds to a boost mode.

4. The bidirectional switching converter of claim 3, wherein the comparator is further configured to generate the offset increase signal to the counter when the differential value is greater than the first threshold.

5. The bidirectional switching converter of claim 4, wherein the second power MOSFET is configured to have a turn-off time moved up in response to the offset increase signal when the operation mode is the buck mode and the offset increase signal is input to the counter.

6. The bidirectional switching converter of claim 4, wherein the first power MOSFET is configured to have a turn-off time delayed in response to the offset decrease signal when the operation mode is the boost mode and the offset decrease signal is input to the counter.

7. The bidirectional switching converter of claim 4, wherein the first power MOSFET is configured to have a turn-off time moved up in response to the offset increase signal when the operation mode is the boost mode and the offset increase signal is input to the counter.

8. The bidirectional switching converter of claim 4, wherein the ZCD auto-calibration circuit further comprises an additional comparator receiving the differential value from the differentiator and comparing the differential value with a second threshold, and
wherein the counter is further configured to increase an increment of offset to be great when the differential value is greater than the first threshold and the second threshold.

9. An electronic device comprising:
a battery;
a bidirectional switching converter including a first power metal oxide semiconductor field effect transistor (MOSFET) connecting a first node to a switching node, a second power MOSFET connecting the switching node to a ground node, and a zero current detection (ZCD) auto-calibration circuit configured to perform one of an operation of generating a first offset for varying a turn-on time of the first power MOSFET according to an operation mode and an operation of generating a second offset for varying a turn-on time of the second power MOSFET according to the operation mode;

a first interface providing the battery with a power supplied from an external device; and a second interface providing the external device with a power output from the battery, wherein the ZCD auto-calibration circuit is further configured to change one of a value of the first offset and a value of the second offset, based on a differential value of a voltage of the switching node and a forward-bias detection result.

10. The electronic device of claim 9, wherein the ZCD auto-calibration circuit comprises:

a differentiator configured to differentiate the voltage of the switching node to obtain the differential value;

a comparator configured to receive the differential value from the differentiator, compare the differential value with a first threshold and output an offset increase signal for increasing one of the first offset and the second offset;

a diode detector configured to detect a detection of one of a forward bias voltage between a first terminal and a second terminal of the first power MOSFET and a forward bias voltage between a first terminal and a second terminal of the second power MOSFET according to the operation mode, and output an offset decrease signal for reducing one of the first offset and the second offset according to a result of the detection; and a counter configured to receive the offset increase signal and the offset decrease signal for changing one of the first offset and the second offset.

11. The electronic device of claim 10, wherein the diode detector is further configured to detect the forward bias voltage between the first terminal and the second terminal of the second power MOSFET when the operation mode corresponds to a buck mode, and detect the forward bias voltage between the first terminal and the second terminal of the first power MOSFET when the operation mode corresponds to a boost mode.

12. The electronic device of claim 11, wherein the comparator is further configured to generate the offset increase signal to the counter when the differential value is greater than the first threshold.

13. The electronic device of claim 12, wherein the second power MOSFET is configured to have a turn-off time moved up in response to the offset increase signal when the operation mode is the buck mode and the offset increase signal is input to the counter.

14. The electronic device of claim 12, wherein the first power MOSFET is configured to have a turn-off time delayed in response to the offset decrease signal when the operation mode is the boost mode and the offset decrease signal is input to the counter.

15. The electronic device of claim 12, wherein the first power MOSFET is configured to have a turn-off time moved up in response to the offset increase signal when the operation mode is the boost mode and the offset increase signal is input to the counter.

16. The electronic device of claim 12, wherein the ZCD auto-calibration circuit further comprises an additional comparator receiving the differential value from the differentiator and comparing the differential value with a second threshold, and wherein the counter increases an increment of offset to be great when the differential value is greater than the first threshold and the second threshold.

17. The electronic device of claim 9, wherein, the ZCD auto-calibration circuit is configured to determine the operation mode as a buck mode, in response to the external device being identified through the first interface, and wherein, the ZCD auto-calibration circuit is configured to determine the operation mode as a boost mode in response to the external device being identified through the second interface.

18. A method of operating a bidirectional switching converter, the method comprising:

setting an offset;

identifying an identified operation mode of the bidirectional switching converter;

determining whether a forward bias voltage is detected between a first terminal and a second terminal of a first power metal oxide semiconductor field effect transistor (MOSFET) or between a first terminal and a second terminal of a second power MOSFET, according to the identified operation mode; and determining whether an absolute value of a differential voltage of a switching node is greater than a threshold when the forward bias voltage is not detected, wherein the first power MOSFET connects a first node to the switching node, and wherein the second power MOSFET connects the switching node to a ground node.

19. The method of claim 18, wherein, when the identified operation mode corresponds to a buck mode, the determining of whether the forward bias voltage is detected comprises detecting the forward bias voltage between the first terminal and the second terminal of the second power MOSFET; and reducing the initial offset when the forward bias voltage is detected, and wherein the method further comprises increasing the offset when the absolute value of the differential voltage is greater than the threshold.

20. The method of claim 18, wherein, when the identified operation mode corresponds to a boost mode, the determining of whether the forward bias voltage is detected comprises detecting the forward bias voltage between the first terminal and the second terminal of the first power MOSFET; and decreasing the offset when the forward bias voltage is detected, and wherein the method further comprises increasing the initial offset when the absolute value is greater than the threshold.

* * * * *